Figure 1:
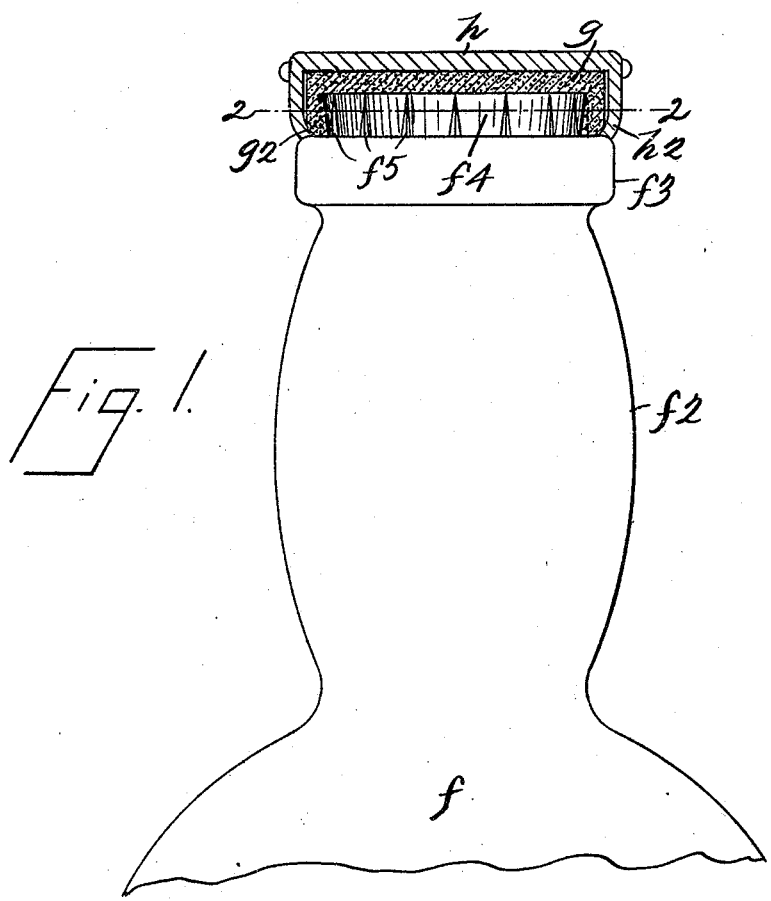

No. 810,736. PATENTED JAN. 23, 1906.
W. B. FENN.
CLOSURE DEVICE FOR GLASS JARS AND OTHER VESSELS.
APPLICATION FILED DEC. 23, 1904.

WITNESSES
INVENTOR
William B. Fenn
BY Edgar Sater & Co
ATTORNEYS

UNITED STATES PATENT OFFICE.

WILLIAM B. FENN, OF SHEEPSHEAD BAY, NEW YORK.

CLOSURE DEVICE FOR GLASS JARS AND OTHER VESSELS.

No. 810,736.      Specification of Letters Patent.      Patented Jan. 23, 1906.

Application filed December 23, 1904. Serial No. 238,052.

*To all whom it may concern:*

Be it known that I, WILLIAM B. FENN, a citizen of the United States, residing at Sheepshead Bay, in the county of Kings and State of New York, have invented certain new and useful Improvements in Closure Devices for Glass Jars and other Vessels, of which the following is a specification, such as will enable those skilled in the art to which it appertains to make and use the same.

This invention relates to closure devices for glass bottles, jars, cans, and similar vessels used in preserving or holding fruits and other articles and for other purposes; and the object thereof is to provide improved closure devices of this class whereby jars, cans, bottles, and similar vessels may be quickly, easily, and conveniently sealed whenever necessary and also easily opened whenever desired; and with this and other objects in view the invention consists in means for closing a vessel of the class specified constructed as hereinafter described and claimed.

The invention is fully disclosed in the following specification, of which the accompanying drawings form a part, in which the separate parts of my improvement are designated by suitable reference characters in each of the views, and in which—

Figure 2:
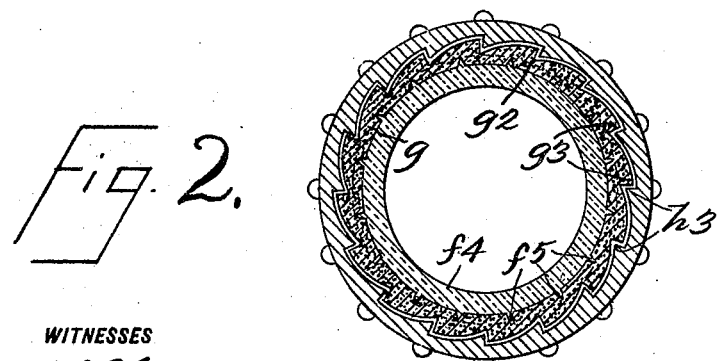

Figure 1 is a side view of the top of the neck of a bottle provided with my improved closure device, part of which is shown in section; and Fig. 2, a section on the line 2 2 of Fig. 1.

In the drawings forming part of this specification I have shown my invention applied for the purpose of closing the neck of an ordinary bottle—such as a beer-bottle, mineral-water bottle, or other bottle of this class—the top portion of the bottle being shown at $f$ and the neck thereof at $f^2$. The neck $f^2$ is preferably provided at the top with an annular enlargement $f^3$, above which is an upwardly-directed neck portion $f^4$, which is of less diameter than the annular enlargement $f^3$ and is shown in full lines in Fig. 1. The outer wall of the neck portion $f^4$ above the annular enlargement $f^3$ is provided with teeth $f^5$, any desired number of which may be employed, and these teeth in the form of construction shown are vertically arranged and wedge-shaped and triangular in cross-section, and in practice I employ a closing-cap $g$, provided with a flange or rim $g^2$, and said cap in sealing the bottle is forced downwardly onto the neck portion $f^4$, so that the flange or rim $g^2$ of the cap $g$ will securely fit the same, and the walls of the neck portion $f^4$ are inclined inwardly and downwardly, and the inner wall or walls of the flange or rim $g^2$ of the cap $g$ are similarly inclined downwardly and inwardly.

The cap $g$ is composed of flexible fibrous material saturated with preservative material, preferably composed of paraffin, or a solution consisting of paraffin or similar substances, or of any substance which will preserve the said cap and render it impervious to the action of the liquids or acids, and said cap $g$ is also provided with a supplemental cap or cover $h$, which incloses the cap $g$ completely and is provided with a flange or rim $h^2$, which incloses the flange or rim $g^2$ of the cap $g$, and the bottom edge of which is preferably curved inwardly, as shown in Fig. 1.

The outer wall of the flange or rim $g^2$ of the inner cap $g$ is provided with teeth $g^3$, the outer walls of which are curved outwardly in horizontal section, and the inner wall of the flange or rim $h^2$ of the supplemental or outer cap $h$ is provided with corresponding teeth $h^3$, the inner walls of which are also curved outwardly, and any desired number of these teeth may be employed, and the said teeth may be of any desired length in horizontal section, and in practice the inner flexible or fibrous cap $g$ is placed in or secured in the outer cap $h$, and in the operation of sealing the bottle the combined closure device thus formed is forced downwardly onto the neck portion $f$ and the outer cap $h$ is turned to the right, and this operation forces the flange or rim $g^2$ of the cap $g$ into close contact with the neck portion $f^4$ and the teeth $f^5$ and forms a perfectly tight and secure closure device for the bottle.

Although I have shown my invention applied for the purpose of closing a bottle, it will be apparent that the same may be employed for closing fruit-jars, cans, and various other vessels of this class, all that is necessary being that the top portion of the vessel shall be formed in the manner herein described.

My invention is in no way limited to the object for which the can, jar, bottle, or other vessel is intended, nor to the material thereof, and various changes in and modifications of the construction herein described may be made without departing from the spirit of my invention or sacrificing its advantages.

Having fully described my invention, what

I claim as new, and desire to secure by Letters Patent, is—

1. A bottle or similar vessel having a top neck portion which is provided on the outer surface thereof with teeth or projections and inwardly and downwardly inclined, and a closure device comprising an inner cap having a depending flange or rim and composed of compressible material saturated with preservative material, and an outer cap having a corresponding depending flange or rim and in which the inner cap is placed, the flange or rim of the inner cap and the flange or rim of the outer cap being provided on or in their adjacent faces with projecting teeth the adjacent walls of which are curved or segmental in form in horizontal section, substantially as shown and described.

2. A bottle or other vessel provided with a neck having an annular enlargement near the top thereof, the outer walls of the top portion of said neck being inwardly and downwardly inclined, and a closure device comprising an inner and an outer cap each of which is provided with a depending flange or rim, the inner cap being composed of flexible material saturated with preservative material, and the flanges or rims of both of said caps being provided in or on their adjacent walls with projecting teeth the corresponding walls of which are curved or segmental in form in horizontal section, substantially as shown and described.

3. A bottle or other vessel provided with a neck having an annular enlargement near the top thereof, the outer walls of the top portion of said neck being inwardly and downwardly inclined, and a closure device comprising an inner and an outer cap each of which is provided with a depending flange or rim, the inner cap being composed of flexible material saturated with preservative material, and the flanges or rims of both of said caps being provided in or on their adjacent walls with projecting teeth the corresponding walls of which are curved or segmental in form in horizontal section, the bottom of the flange or rim of the outer cap being also inwardly contracted, substantially as shown and described.

4. A bottle or other vessel provided with a neck having an annular enlargement near the top thereof, the outer walls of the top portion of said neck being inwardly and downwardly inclined, and a closure device comprising an inner and an outer cap each of which is provided with a depending flange or rim, the inner cap being composed of flexible material saturated with preservative material, and the flanges or rims of both of said caps being provided in or on their adjacent walls with projecting teeth the corresponding walls of which are curved or segmental in form in horizontal section, the bottom of the flange or rim of the outer cap being also inwardly contracted, and the top portion of the neck which is inclosed by the closure device being provided with projecting teeth, substantially as shown and described.

In testimony that I claim the foregoing as my invention I have signed my name, in presence of the subscribing witnesses, this 21st day of December, 1904.

WILLIAM B. FENN.

Witnesses:
C. E. MULREANY,
F. A. STEWART.